US007206891B2

(12) United States Patent
Emerson et al.

(10) Patent No.: US 7,206,891 B2
(45) Date of Patent: Apr. 17, 2007

(54) MULTI-PORT MEMORY CONTROLLER HAVING INDEPENDENT ECC ENCODERS

(75) Inventors: Steven M. Emerson, Chanhassen, MN (US); Gregory F. Hammitt, Eagan, MN (US)

(73) Assignee: LSI Logic Corporation, Milpitas, CA (US)

( * ) Notice: Subject to any disclaimer, the term of this patent is extended or adjusted under 35 U.S.C. 154(b) by 479 days.

(21) Appl. No.: 10/255,912

(22) Filed: Sep. 26, 2002

(65) Prior Publication Data

US 2004/0064646 A1  Apr. 1, 2004

(51) Int. Cl.
*G06F 12/00* (2006.01)
*G06F 13/00* (2006.01)
*G06F 13/28* (2006.01)
*G06F 11/00* (2006.01)
*G06F 11/08* (2006.01)

(52) U.S. Cl. ............... 711/100; 711/155; 711/168; 714/49; 714/54

(58) Field of Classification Search ........... 711/100, 711/155, 168; 714/49, 54
See application file for complete search history.

(56) References Cited

U.S. PATENT DOCUMENTS

| 4,794,601 | A | * | 12/1988 | Kikuchi | 714/758 |
| 5,146,461 | A | * | 9/1992 | Duschatko et al. | 714/772 |
| 5,459,842 | A | * | 10/1995 | Begun et al. | 711/155 |
| 6,718,444 | B1 | * | 4/2004 | Hughes | 711/155 |
| 6,792,567 | B2 | * | 9/2004 | Laurent | 714/763 |
| 2002/0053004 | A1 | * | 5/2002 | Pong | 711/119 |

OTHER PUBLICATIONS

IEEE Spectrum, Adding Error-Correcting Circuitry to ASIC Memory, Apr. 2000, vol. 37, No. 4.

* cited by examiner

*Primary Examiner*—Hyung Sough
*Assistant Examiner*—Mardochee Chery
(74) *Attorney, Agent, or Firm*—Westman, Champlin & Kelly

(57) ABSTRACT

A memory controller system is provided, which includes a plurality of system buses, a multi-port memory controller and a plurality of error correcting code (ECC) encoders. The memory controller has a plurality of system bus ports and a memory port. Each ECC encoder is coupled between a respective system bus and a respective system bus port of the memory controller.

11 Claims, 5 Drawing Sheets

MULTI-PORT MEMORY CONTROLLER HAVING INDEPENDENT ECC ENCODERS

BACKGROUND OF THE INVENTION

The present invention relates to memory controllers in semiconductor integrated circuits and, more particularly to the use of error correction codes (ECCs) with multi-port memory controllers.

Error correction codes have been used to detect and correct errors in data that has been stored in memory or transmitted from one location to another. A simple ECC code is based on parity. A parity bit is added to a group of data bits, such as a data word, and has a logic state that is selected to make the total number of 1s (or 0s) in the data word either even or odd. The original data word is then transmitted or stored along with the additional parity bit as a modified data word. In a memory storage system, when the modified data word is read from memory an ECC detection circuit checks the parity of the modified data word against an expected value. If the parity is correct, the ECC detection circuit assumes there are no bit errors. If the parity is incorrect, the ECC detection circuit assumes there is an error in the stored data.

More complex ECC codes have also been used for enabling not only detection of additional errors but also correction of some of the detected errors. For example, a single-error correction, double-error detection (SEC-DED) Hamming code adds enough additional parity bits to enable the detection circuit to detect and correct any single-bit error in a data word and detect two-bit errors. Other types of error correction codes include convolutional (tree) codes and block codes. In these types of ECC codes, one or more data words are divided into blocks of data and each block of data is encoded into a longer block of data. With convolution codes, the encoding of one block of data depends on the state of the encoder as well as the data to be encoded. With block codes, each block of data is encoded independently from every other block of data.

Recently, there has been an increase in interest in using ECC codes while writing data to and reading data from integrated circuit memories, such as random access memories (RAMs), dynamic random access memories (DRAMs), and double data rate (DDR) DRAMs. The use of ECC codes with integrated circuit memories has been found to increase manufacturing yield of integrated circuit memories and reduce problems with random cell defects in memory arrays.

Integrated circuit memories are typically controlled by a memory controller, which regulates access to and from the memory. A typical memory controller is implemented as a state machine on an integrated circuit. The memory can be either embedded on the same integrated circuit as the memory controller or implemented as an external device. The ECC support circuitry is typically implemented within the memory controller state machine.

With each new memory technology such as current SDR, DDR, RLDRAM, FCRAM, etc., typically a new memory controller must be designed to interface to these new technologies with its associated electrical and functional protocol. If the architecture of a memory controller is such that it contains ECC support circuitry, then migrations to new memory technologies require that each new memory controller be designed with this same support circuitry. Write data paths must be modified to include the ECC generation circuitry and the merging of the original data bits with the ECC bits. The read data path must be modified to include the ECC detection and correction circuitry. This complicates the design of these newer memory controllers.

Another disadvantage of implementing the ECC support circuitry as part of the memory controller state machine is that the ECC support circuitry reduces overall performance of multi-port memory systems when multiple access requests need to be serviced by the memory controller. If the memory controller is busy processing ECC codes during a read or write operation for one port, the other ports must wait until the entire read or write operation has completed before gaining access to the memory controller. This difficulty becomes worse during "read/modify/write" operations. A read/modify/write operation is required when a bus master attempts to write a smaller number of bits than the width of an ECC block. An ECC block is defined the basic unit of data to which the ECC bits apply. When partial ECC block writes are executed, the memory controller must read the original data that is stored in the memory location being written to and then merge the read data with the new data to form a full ECC block. The appropriate ECC bits are then generated for the full ECC block and then written with the ECC block into the memory address.

This read/modify/write operation can take a number of extra clock cycles to complete. If the memory controller is busy performing a read/modify/write operation when another memory access request occurs from a second port, the second port must wait until the read/modify/write operation for the first port is completed. This increases the memory access latency of the second port and can degrade overall performance.

Improved memory controller systems are therefore desired which are modular in design and capable of supporting ECC codes without significantly degrading performance of the system.

SUMMARY OF THE INVENTION

One embodiment of the present invention is directed to a memory controller system, which includes a plurality of system buses, a multi-port memory controller and a plurality of error correcting code (ECC) encoders. The memory controller has a plurality of system bus ports and a memory port. Each ECC encoder is coupled between a respective system bus and a respective system bus port of the memory controller.

Another embodiment of the present invention is directed to a method of writing data to a memory through a multi-port memory controller. Memory access requests received from a plurality of system busses are processed through respective system bus ports of the memory controller. Each port has a respective ECC encoder having an ECC block width. Write data is received from a first of the system buses and, if the write data has a width that is equal to the ECC block width, the write data is applied to the respective ECC encoder as an ECC block. If the write data has a width that is less the ECC block width, data is read from the memory address within the memory through the respective port of the memory controller and merged with the write data to form the ECC block. The ECC block is then applied to the respective ECC encoder. A set of ECC bits are generated with the ECC encoder based on the ECC block and are written along with the ECC block to the memory address through the respective port of the memory controller.

DETAILED DESCRIPTION OF THE PREFERRED EMBODIMENTS

Figure 1:
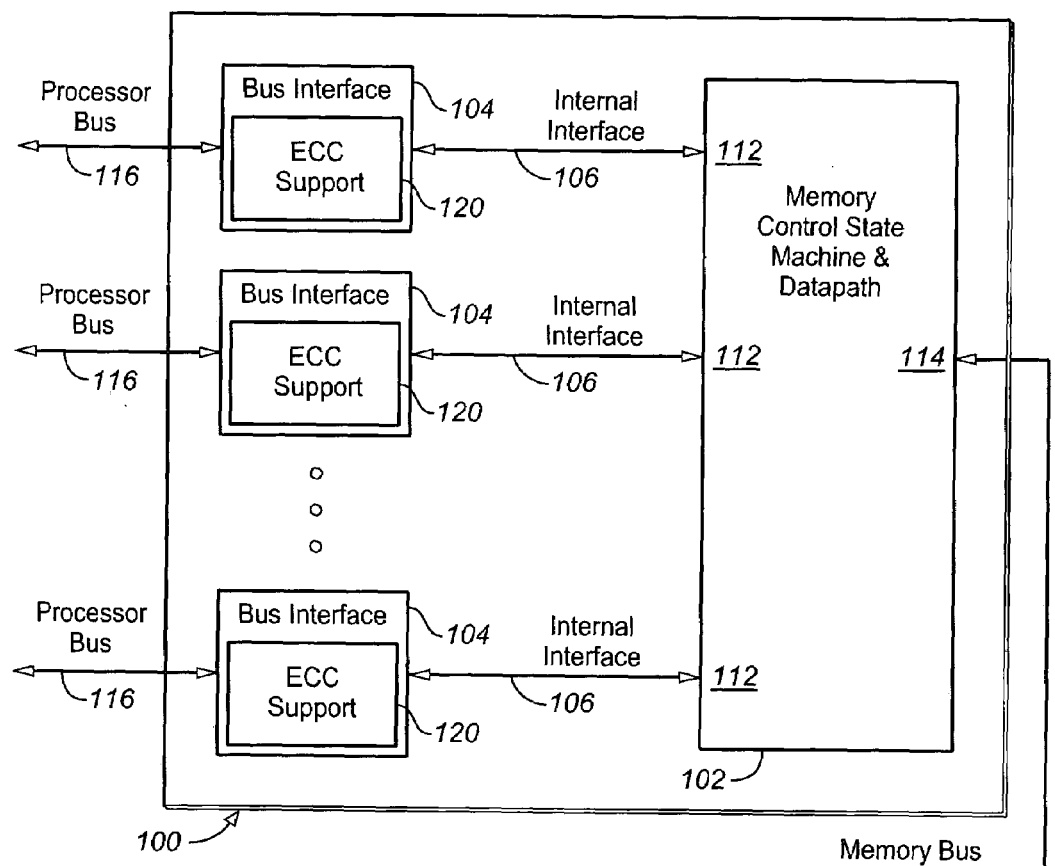
FIG. 1 is a block diagram of a multi-port memory controller system according to one embodiment of the present invention.

FIG. 1 is a block diagram of a multi-port memory system 100, which supports the use of error correction codes (ECCs) according to one embodiment of the present invention. System 100 includes multi-port memory controller 102, a plurality of bus interface circuits 104 and an internal interface 106 for each bus interface 104.

Memory controller 102 has a memory port 114, which is coupled to a memory bus 110. Memory bus 110 is coupled to one or more memory devices 108. In one embodiment, memory controller 102 is implemented as a state machine. Other implementations can also be used. Memory controller 102 enforces the bus protocol for memory bus 110 to properly read from and write to memory 108. Memory 108 can be embedded within the same integrated circuit as system 100 or implemented as an external device on a different integrated circuit. Memory 108 can include any type of memory device, such as a synchronous random access memory (SRAM), a dynamic random access memory (DRAM), a Flash memory, etc. For example, memory 108 can include a single data rate synchronous dynamic random access memory (SDRAM) or a double data rate DDR SDRAM. Other types can also be used.

Memory controller 102 has a plurality of system bus ports 112, which are coupled to respective bus interface circuits 104 over internal interfaces 106. In one embodiment, internal interfaces 106 define rigid interfaces, which allow memory controller 102 to be modular so that the memory controller can be easily exchanged with other combinations of blocks having the same interface, such as other memory controllers. Internal interfaces 106 can also include a central arbiter function as shown in more detail in FIG. 2 for arbitrating between memory requests received by bus interface circuits 104.

Bus interface circuits 104 are each coupled to a respective system or processor bus 116. Each bus 116 is coupled to one or more master or slave devices (not shown). Each bus 116 includes the appropriate data, address and control bits for implementing a desired bus protocol. Any protocol can be used with the present invention. For example in one embodiment, one or more of the buses 116 are consistent with the Advanced Micro-controller Bus Architecture (AMBA), available from ARM Limited of Cambridge, England. One such bus, known as the AMBA Advanced High-performance Bus (AHB) bus design, provides high performance, high clock frequency transfers between multiple bus masters and multiple bus slaves. A bus master is a device that is capable of initiating a read or write operation to read data from or write data to a slave device by providing address and control information. A bus slave device is a device that responds to a read or write request and provides a return indicating the success, failure or waiting status of the data transfer. In FIG. 1, Bus interface circuits 104 are bus slaves. In this example, the data portions of buses 116 have either 64 bits or 32 bits.

Each bus interface 104 implements its respective bus protocol and allows the masters on each bus 116 to read data from and write data to memory 108 through memory controller 102. In one embodiment, the line buffer in each bus interface circuit can accumulate partial word writes before completing a write of a larger group of write data to memory 108. This helps reduce the overall system memory bandwidth requirement, which is magnified in the case of systems that support ECC.

Each bus interface 104 further includes an ECC support circuit 120 for improving the integrity of read and write operations. ECC circuit 120 operates on successive blocks of read or write data known as an ECC block. For each ECC block received within the write data from bus from 116, ECC support circuit 120 generates a set of encoded ECC bits and appends the set of ECC bits to the ECC block for transfer to memory controller 102. Memory controller 102 then writes the ECC block and the associated set of ECC bits to the desired memory location in memory 108.

During a read operation bus interface circuit 104 receives a read request over bus 116, which is provided to memory controller 102 over internal interface 106. When memory controller 102 processes the read request, memory controller 102 retrieves the requested data from memory device 108 and provides the read data to the bus interface 104 that requested the data. For each ECC block read from memory device 108, ECC support circuit 120 calculates a new set of ECC bits and checks the newly calculated ECC bits against the set of ECC bits that were stored with the ECC block. If the ECC bits match, ECC support circuit 120 assumes there are no bit errors and provides the read data to bus 116. If there is a mismatch in the ECC bits, depending on the ECC code used by circuit 120, circuit 120 flags the error on bus 116 or attempts to correct the error.

ECC support circuit 120 can implement any error detecting or correcting code. For example, ECC support circuit 120 can implement a parity-based ECC code in which one or more "parity" or "check" bits are appended to each ECC block. For example, the ECC code can be implemented as a Hamming code, a modified Hamming code such as a SEC-DED code, a convolutional (tree) code or other block codes. Other types of ECC codes can also be used.

Depending on the type of ECC code used, the read and write data paths through internal interfaces 106, memory controller 102 and memory bus 110 must be widened to accommodate the additional ECC bits. For example with one SEC-DED ECC code, if the data portion of bus 116 is 64 bits wide and ECC support circuit 120 generates eight ECC bits for each 64-bit data word, the read and write data paths through interface 106, memory controller 102 and memory bus 110 are widened to support 72 data bits. The data paths can be any multiple of 72 bits in this example.

The ECC block can have any width in alternative embodiments of the present invention. For example, SEC-DED block codes can apply to a 16-bit data word in which six additional ECC "check bits" are added for a total of 22 bits, or can be applied to a 32-bit data word in which seven additional ECC check bits are added for a total of 39 bits. Other bit combinations can also be used.

By moving ECC support circuits 120 externally to memory controller state machine, memory controllers supporting new memory technologies can be designed with a lower complexity level (more easily integrated to the new technologies). The only modification that is required is that the data paths be widened to support the additional ECC bits. The operation of the state machine itself does not need to be modified. For example, read-modify-write functionality for partial word writes does not have to be implemented in the memory controller. The memory controller will always do full block sized writes.

Also, for multi-port memory systems such as that shown in FIG. 1, each port has its own ECC support circuitry. As a result, the ECC codes can be processed for one port in parallel with read or write operations being performed on another port. This significantly decreases the memory access latency of each port by allowing other ports to proceed in parallel with ports doing a partial block write. If byte gathering, read-modify-write, and ECC encode circuits are implemented as part of the memory controller then no other ports would be able access the external memory while the update is progressing.

Figure 2:
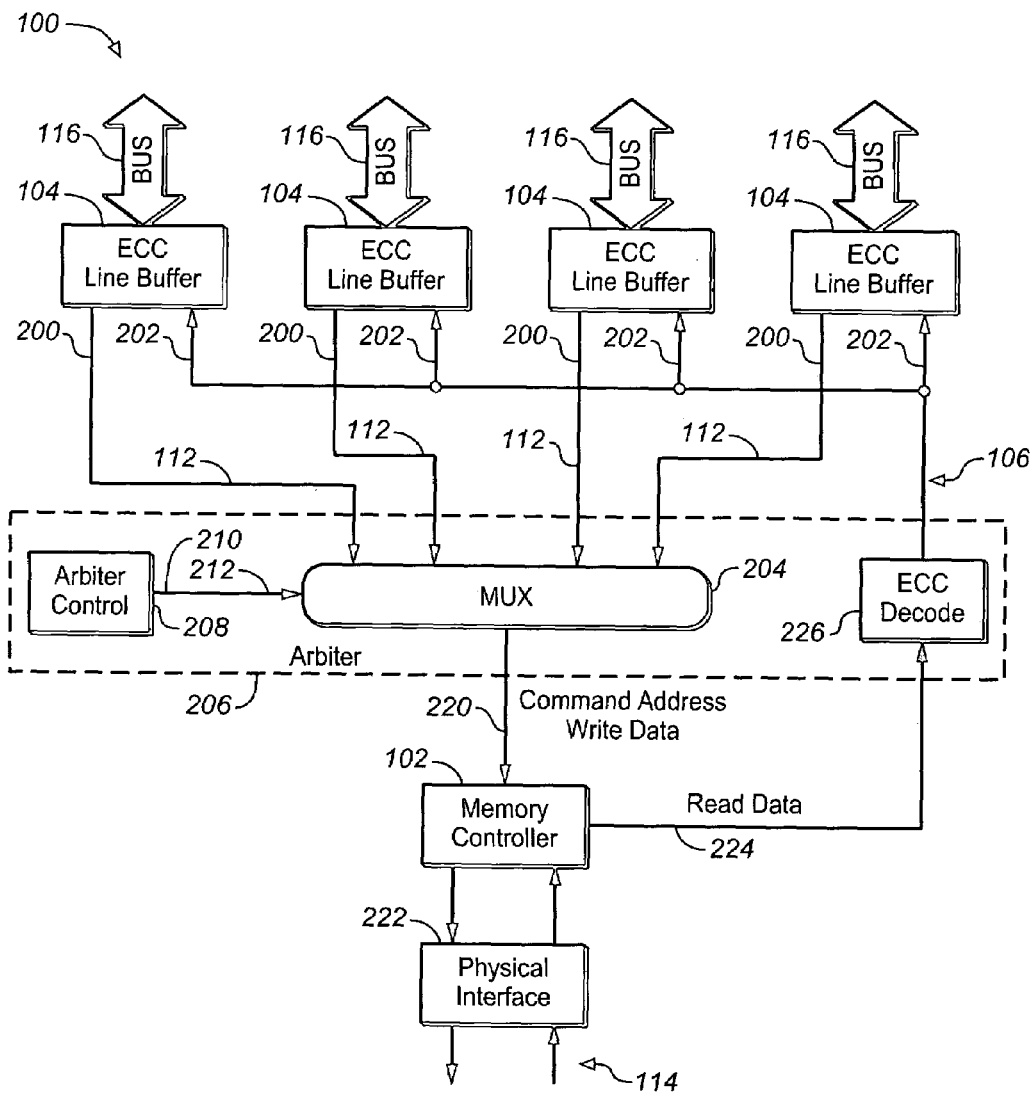
FIG. 2 is a block diagram illustrating the memory controller system in greater detail, according to one embodiment of the present invention.

FIG. 2 is a block diagram illustrating memory system 100, which shows the interfaces between bus interface circuits 104 and memory controller 102 in greater detail, according to one embodiment of the present invention. The same reference numerals are used in FIG. 2 as were used in FIG. 1 for the same or similar elements. In this figure, bus interface circuits 104 are each labeled "ECC Line Buffer" to reflect the buffer within each circuit. Each bus interface circuit 104 is coupled to a respective bus 116 and has an output 200 and an input 202 that form part of the internal interface 106.

Interface 106 further includes an arbiter 206, which arbitrates between incoming memory access requests received from bus interface circuits 104. Arbiter 206 includes a multiplexer 204, arbiter control circuit 208 and a shared ECC decode circuit 226. Outputs 200 of bus interface circuits 104 are each coupled to a respective input of multiplexer 204. In this embodiment of the present invention the inputs to multiplexer 204 correspond to the system bus ports 112 shown in FIG. 1 of memory controller 102 for incoming memory requests.

Arbiter control circuit 208 has an arbitration control output 210 coupled to select input 212 of multiplexer 204. Arbiter control circuit 208 can be configured to implement any suitable arbitration procedure for selecting which bus interface circuit 104 gets access to memory controller 102. The output of multiplexer 104 is coupled to input 220 of memory controller 102. The output of multiplexer 204 includes command information, write data, and the address in memory 108 to which the write data is to be written. Also, a tag is provided to memory controller 102 to identify the bus interface circuit 104 to which the memory access request belongs. Memory controller 102 receives the memory access request and supplies the appropriate write control, data and address signals to physical interface 222. Physical interface 222 couples to memory bus 110 (shown in FIG. 1) and forms memory port 114.

During a write operation, a write request is received by one of the bus interface circuits 104 over bus 116. That bus interface circuit 104 passes the write request and associated write data (with the ECC bits) to the respective system bus port 112 of arbiter 206. When arbiter control circuit 208 grants access to the requesting bus interface circuit, multiplexer 204 passes the write request and write data to memory controller 102. Memory controller 102 then stores the write data in the desired memory location of memory 108 (shown in FIG. 1) through physical interface 222.

During a read operation, a read request is received by one of the bus interface circuits 104 over bus 116. That bus interface circuit 104 passes the read request to the respective system bus port 112 of arbiter 206. When arbiter control circuit 208 grants access to the requesting bus interface circuit, multiplexer 204 passes the read request to memory controller 102. Memory controller 102 then retrieves the requested data from memory 108 (shown in FIG. 1) through physical interface 222. Memory controller 102 passes the read data to output 224 and tags the data with and identification of the port number that requested the data. The read data and the associated tag are passed to ECC decode circuit 226. ECC decode circuit 226 re-calculates the ECC bits for each ECC block contained in the read data and compares the new ECC bits with the ECC bits retrieved with the read data. ECC decode circuit 226 then passes either correct data, corrected data or bad data to inputs 202 of bus interfaces 104, together with the tag. If the read data is bad, ECC decode circuit 226 sets a status flag that can be read by bus interface circuits 104. The bus interface circuit 104 that corresponds to the tag provided by memory controller 102 latches the read data in its read data register and then passes the latched read data to the corresponding bus 116.

In the embodiment shown in FIG. 2, ECC decode circuit 226 is shared by each bus interface circuit 104. This reduces the number of logic gates that are required to implement the ECC decode circuit. In an alternative embodiment, each bus interface 104 includes its own ECC decode circuit.

Figure 3:
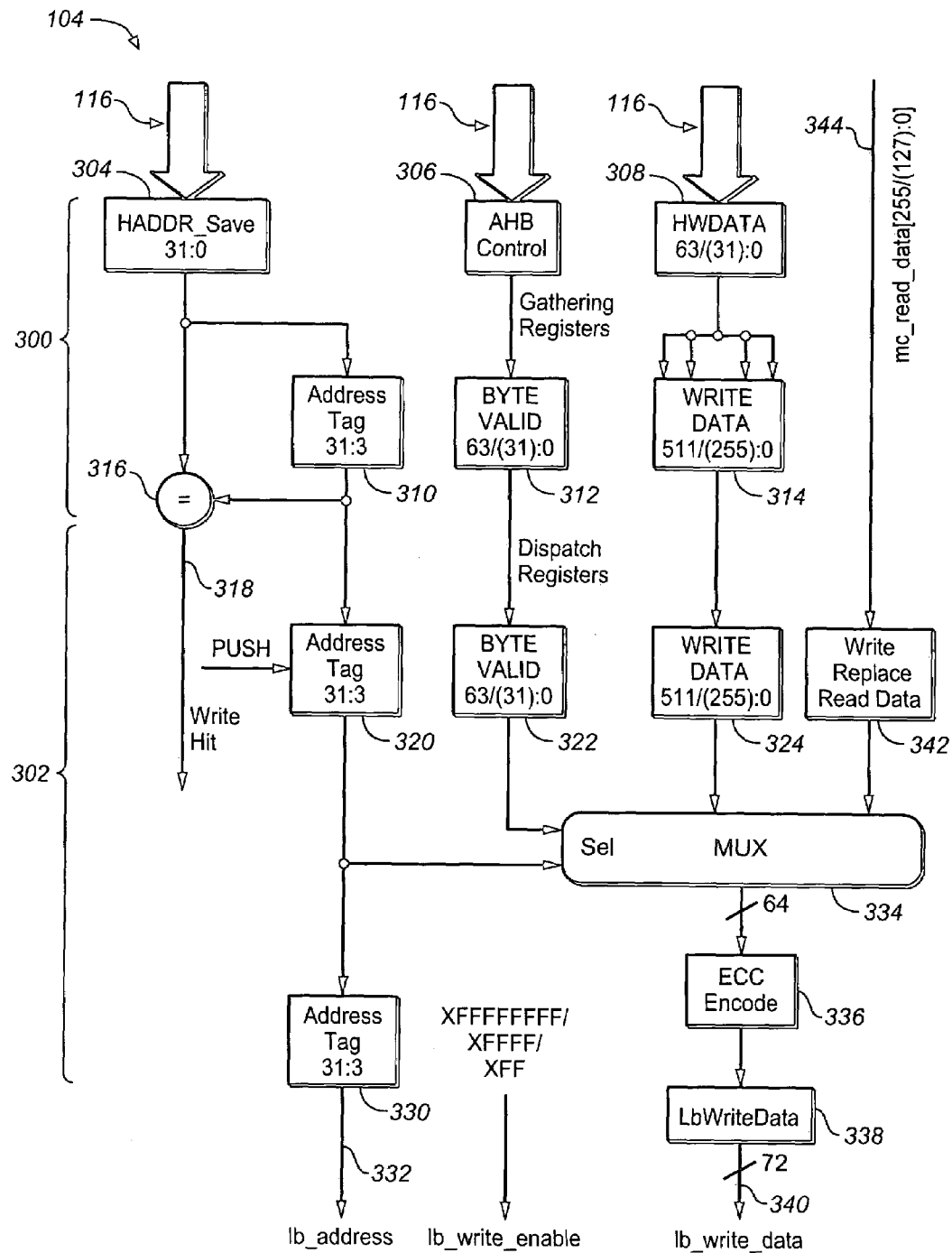
FIG. 3 is a block diagram illustrating elements of a bus interface circuit within the system shown in FIGS. 1 and 2 that are used during a write operation, according to one embodiment of the present invention.

FIG. 3 is a block diagram illustrating the elements of one of the bus interface circuits 104, which are used during a write operation, according to one embodiment of the present invention. Bus interface circuit 104 includes a line buffer 300 and a dispatch circuit 302. Line buffer 300 includes an address register 304, a control register 306 and a data register 308, which are coupled to address, control and data portions of bus 116. Line buffer 300 further includes gathering registers, which include address tag register 310, byte valid register 312 and write data register 314.

When a write request is received from bus 116, the address, control and data are stored in registers 304, 306 and 308. In one embodiment, address register 304 is 32 bits wide, and data register 308 is 64 bits wide. The address associated with the write request is stored in address register 304 and is passed to address tag register 310. In one embodiment, the most significant 30 bits of the write address are stored in address tag register 310. With each new write request, the contents of address register 304 are compared to the contents of address tag register 310 by equivalence element 316. If the two addresses are equal and if the write request is valid, a write hit has occurred, as indicated by output 318, and the associated write data is captured in data register 308.

The write data is then transferred to the proper byte, half word, word or double word of write data register 314 and the proper bits are set or cleared in byte valid register 312 to indicate which bytes in write data register 314 are valid. Not all bytes of the 64-bit data register 308 need to be valid. For each byte of the 64-bit data word received from write data register 308, a corresponding bit of byte valid register 312 is set to indicate that the corresponding byte is valid. Write data register 314 can have any suitable size for gathering write data. In one embodiment, write data register 314 is 512 bits wide. In another embodiment, write data register is 256 bits wide.

If the address stored in address register 304 does not match the address tag stored in address tag register 310 (indicating a different memory location is to be accessed) and if dispatch circuit 302 not busy, the address tag, byte valid information, and write data are transferred from registers 310, 312 and 314 to dispatch registers 320, 322 and 324, respectively.

Bus interface circuit 104 then asserts a request to arbiter 206 (shown in FIG. 2) for the write request to be processed. When the request is granted, dispatch circuit 302 completes the write operation. The address tag is transferred from tag register 320 to tag register 330 to form a line buffer address 332, which is used by the memory controller to perform the write operation. Successive blocks of write data are passed through multiplexer 334 to ECC encoder 336. Multiplexer 334 uses the address tag stored in tag register 320 and the byte valid information stored in byte register 322 to select the successive blocks of write data for transfer to ECC encoder 336 and write data register 338. The number of bits in each block of write data matches the ECC block size of ECC encoder 336. For example if the ECC block size is 64 bits, each block of write data passed through multiplexer 334 is 64 bits wide.

ECC encoder 336 calculates the appropriate set of ECC bits and appends the bits to the block of write data (an ECC block). The ECC block and the set of ECC bits are then written to line buffer write data register 338. Register 338 has an output 340, which is coupled to memory controller 102 (shown in FIGS. 1 and 2) through arbiter 206. In one embodiment, the set of ECC bits includes eight parity bits, with each parity bit being a function of a number of data bits from one or more bytes of data. In this embodiment, output 340 is 72 bits wide.

Dispatch 302 further includes "Write Replace Read Data" circuit 342, which is used to fill missing bytes of data when a particular block of write data has a size that is less than the ECC block size. For example, if the ECC block size is 64 bits wide and the block of write data is one byte wide, seven additional bytes are needed to form a full ECC block on which to calculate the ECC bits. These additional bytes are supplied by circuit 342. Circuit 342 has a memory read data input 344 coupled to the output of ECC decoder 226 (shown in FIG. 2) and an output coupled to multiplexer 334.

Circuit 342 reads the existing data that is stored in the address to which the block of write data will be written, and supplies the existing data to multiplexer 334. Based on the byte valid information received from byte valid register 322, multiplexer supplies the valid write data from write data register 324 and any missing bytes from circuit 342 to form a full ECC block that can be supplied to ECC encoder 336. ECC encoder 336 calculates a new set of ECC bits for the full ECC block, as modified by the new write data, and supplies the modified ECC block and the new ECC bits to write data register 338. The modified ECC block and the new ECC bits are then written to the memory address through memory controller 102.

This "read/modify/write" operation can take a number of extra clock cycles to complete as compared to a full ECC block write operation. However since each bus interface circuit 104 has its own ECC encoder 336, other ports can access the memory through the memory controller while one port is busy processing the read/modify/write command. For example, the memory controller is available to process other memory access requests when one port is busy gathering write data from the bus, merging the write data with previously existing read data, or generating the appropriate ECC bits. Other ports do not have to wait for the complete read/modify/write operation to complete. If memory controller 102 is currently not busy processing a write or read command, any other port can access the memory controller.

In order to prevent write conflicts during a read/modify/write operation, the bus interface circuit 104 that is performing the operation sends a "write lock" signal (not shown) to the arbiter in the memory controller to prevent another bus interface circuit 104 from writing to the memory locations that are affected by the read/modify/write operation. However, reads from those memory locations are allowed.

Figure 4:
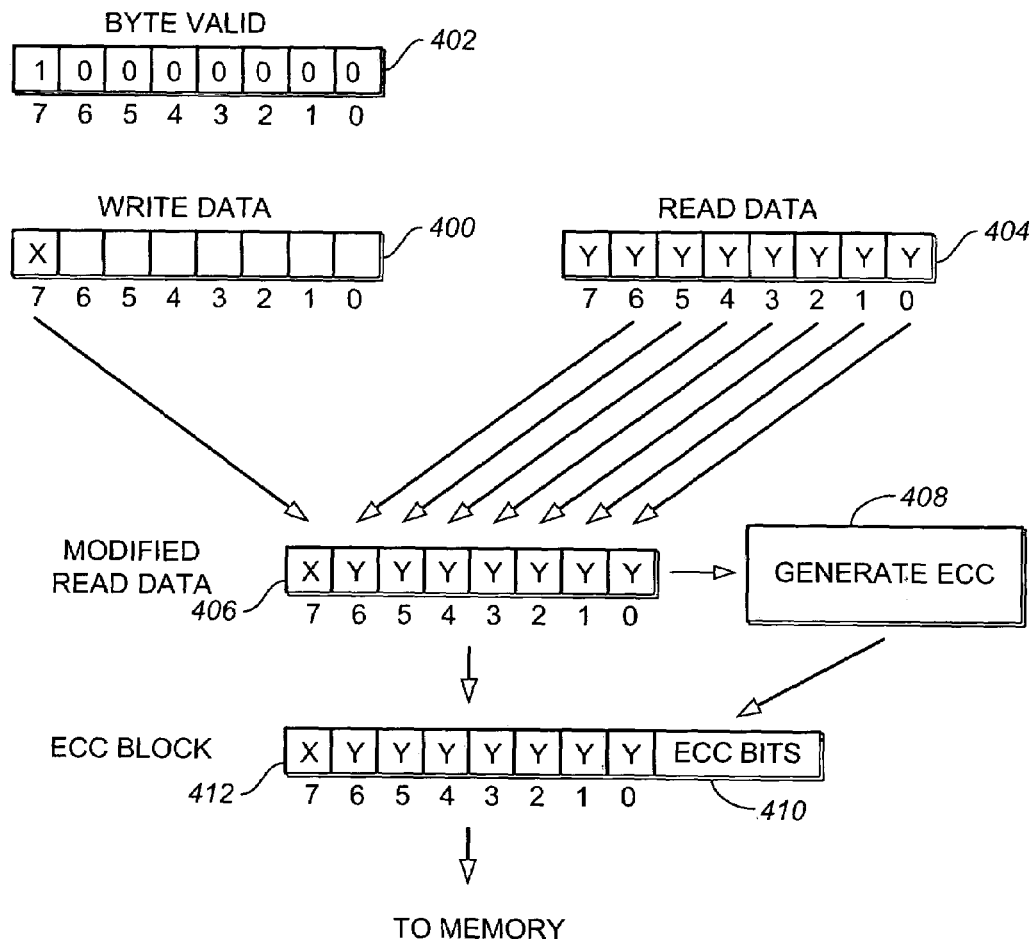
FIG. 4 is a diagram schematically illustrating a read/modify/write operation, according to one embodiment of the present invention.

FIG. 4 is a diagram, which schematically illustrates the modify portion of a read/modify/write operation in more detail. Block 400 represents one of the 64-bit write data blocks stored in write data register 324. Each byte of block 400 is labeled "0" to "7" in the diagram to indicate a corresponding byte number. In this example, only byte 7 has valid data, as indicated by the "X". The corresponding bits in byte valid register 322 are shown at 402. Each bit is labeled "0" to "7" to indicate the corresponding byte in write data block 400. Only bit 7 corresponding to byte 7 of the write data block 400 is set to "1" indicating that only byte 7 is valid.

Since block 400 is not full, the bus interface circuit retrieves the remaining bytes from the corresponding address in memory. The data read from the corresponding address is shown at block 404. Each byte in block 404 contains data that is labeled "Y". The read data in block 404 is modified with the new write data in block 400 by merging the new write data into the read data as shown by modified read data block 406. The missing bytes in write data block 400 are filled with the read data obtained from block 404 to form a full ECC block 412 in which a corresponding set of ECC bits can be generated at 408. The resulting ECC bits 410 are then appended to the full ECC block 412. ECC bits 410 can be appended to the end of ECC block 412 or interleaved at various locations within the ECC block.

Figure 5:
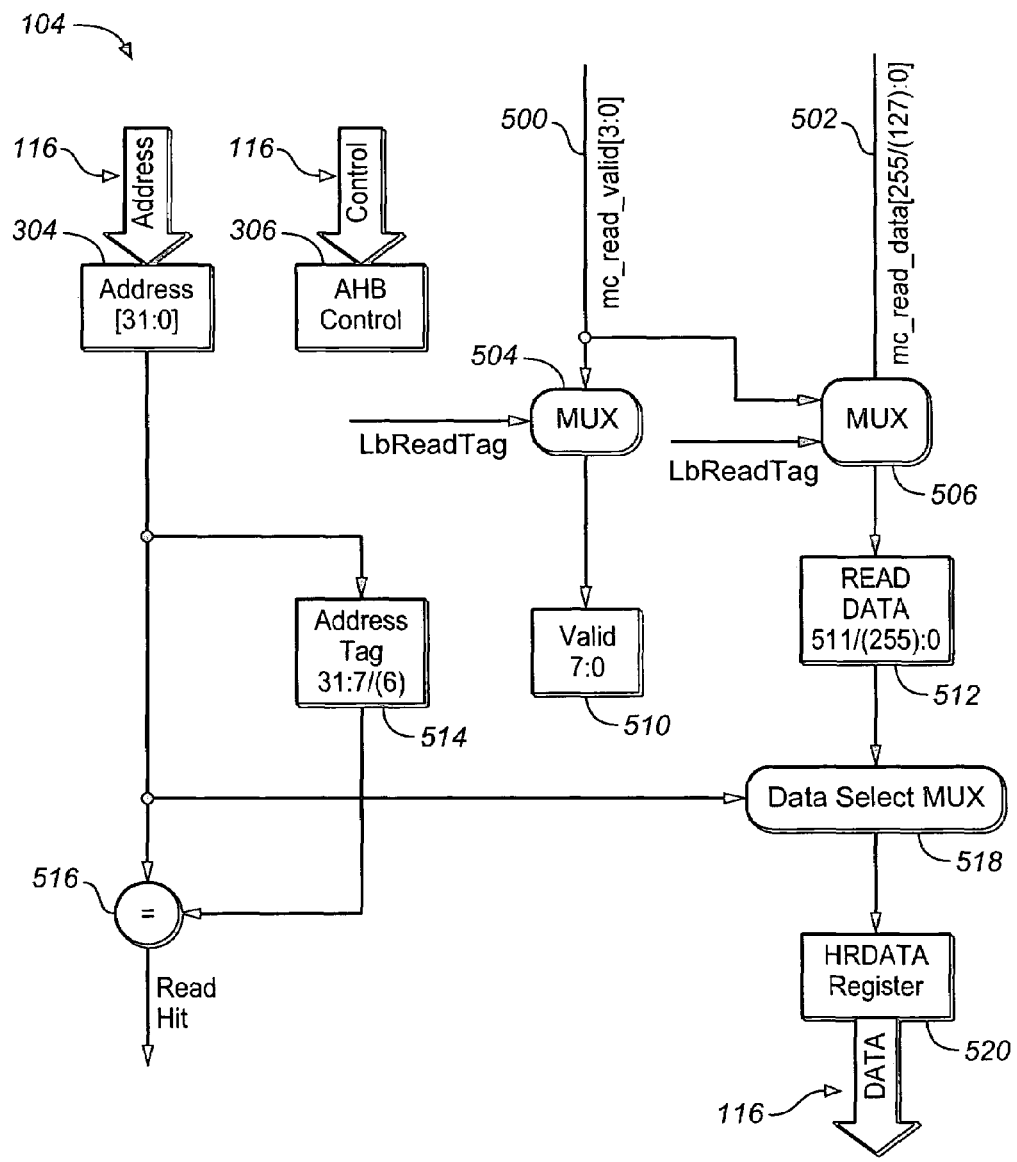
FIG. 5 is a block diagram illustrating elements of the bus interface circuit that are used during a read operation, according to one embodiment of the present invention.

FIG. 5. is a block diagram, which illustrates the elements within bus interface circuit 104 that are used during a read operation. The same reference numerals are used from FIG. 5 as were used in FIG. 3 for the same or similar elements. Bus interface 104 includes address register 304 and control register 306, which are coupled to respective address and control portions of bus 116. Bus interface circuit 104 also has a memory read valid input 500 and a memory read data input 502. Input 500 is coupled to multiplexer 504, and input 502 is coupled to multiplexer 506. The different bits of read valid input 500 can be used for indicating different portions of the read data being present on input 502. The read tag supplied by memory controller 102 is used as a select input for multiplexers 504 and 506 such that read valid input 500 and read data input 502 are loaded into read valid register 510 and read data register 512 when the read data on input 502 corresponds to the read request sent by that bus interface circuit 104. In addition, the read data valid input 500 is used to select only those portions of read data input 502 that are valid.

When selected by multiplexer 504, read valid input 500 is loaded into read valid register 510. Again, each bit of read valid register 510 indicates whether a corresponding byte in read data register 512 is valid. Read data register 512 can have any size such as 512 bits or 256 bits for buffering read data from input 502.

Upon receiving a read request from bus 116, the address and control information are latched within address and control registers 304 and 306. The address is compared by element 516 with the address tag bits stored in address tag register 514 to determine if a read hit has occurred. If a read hit has occurred, the requested data is already present in read data register 512, and data select multiplexer 518 loads the appropriate data into read data register 520. The output of read data register 520 is coupled to bus 116 for reading by the bus master.

If a read hit did not occur, bus interface circuit 104 fetches the requested data from external memory 108 (shown in FIG. 1) through arbiter 206 (shown in FIG. 2) and memory controller 102 (shown in FIGS. 1 and 2). When the data is present in read data register 512, data select multiplexer 518 transfers the data to data register 520 and notifies the bus master that the data is available. Additional logic can be included in the read data path to support additional functions of bus interface circuit 104.

The details of bus interface circuit 104 shown in FIGS. 3 and 5 are simply one example of how a bus interface circuit can be modified to support the use of ECC codes according to one embodiment of the present invention. Any other bus interface circuit can be modified to support the use of ECC codes according to the present invention. Also, the ECC support circuitry can be implemented as an integral part of the bus interface circuit or as a separate logic block that resides in the data path between the bus and the memory controller. Alternatively, the ECC support circuitry can be implemented as part of the memory controller state machine. The bus interface circuit can be implemented as a separate logic block from the memory controller or can be implemented as part of the same logic block. In one embodiment, the bus interface circuit and the memory controller are implemented as separate state machines in order to simplify modifications to the memory controller for supporting ECC codes.

Embodiments of the present invention in which ECC support circuitry is separate from the memory controller allow reusability of previously designed memory controllers. This provides a more modular memory system architecture. In a multi-port memory system, the use of separate ECC support circuitry for each port increases the overall performance of the system by providing parallel operation of the ECC check and generation functions with other reads and/or writes through other ports. Also, the parallel ECC support circuitry allows the line buffers in each port to accumulate write data from consecutive writes over the bus before continuing on with a read/modify/write operation. In this way, the memory system bandwidth can be reduced. With a typical memory controller it is very difficult for the memory controller to accumulate partial word writes before updating the complete data block in memory. With the embodiment shown in FIGS. 1–5, partial word writes through the memory controller can be avoided.

Although the present invention has been described with reference to preferred embodiments, workers skilled in the art will recognize that changes may be made in form and detail without departing from the spirit and scope of the invention. For example, the memory controller can have a single port or any number of multiple ports in alternative embodiments of the present invention. The particular bus interface circuit in which the ECC support circuitry is used can have any structure or operation. Also, any type of ECC support circuitry can be used. In addition, the term "coupled" used in the specification and the claims can include a direct connection or a connection through one or more intermediate elements.

What is claimed is:

1. A memory controller system comprising:
   a plurality of system buses;
   a multi-port memory controller comprising a plurality of system bus ports and a memory port;
   a plurality of error correcting code (ECC) encoders, wherein each ECC encoder is coupled between a respective system bus and a respective system bus port of the memory controller, wherein each ECC encoder is adapted to receive write data on an ECC input, which has an ECC block width, generate a set of ECC bits based on the write data, and apply the set of ECC bits with the write data on an ECC output; and
   for each ECC encoder, a respective line buffer coupled between the respective system bus and the ECC input, which gathers write data from the system bus into groups of write data, corresponding to respective memory addresses, and applies each group of write data to the ECC input as an ECC block if the group has a width that is equal to the ECC block width, and if the group of write data has a width that is less the ECC block width, then the line buffer receives read data from the memory address through the memory controller, merges the read data with the group of write data to form the ECC block and then applies the ECC block to the ECC input.

2. The memory controller system of claim 1 and further comprising a memory coupled to the memory port via a memory bus.

3. The memory controller system of claim 2, wherein the multi-port memory controller comprises:
   means for granting access to the memory by one of the line buffers while another of the line buffers is merging the read data from the memory address with the group of write data to form the ECC block and applying the ECC block to the ECC input.

4. The memory controller system of claim 2 wherein the multi-port memory controller comprises:
   means for granting access to the memory by one of the line buffers while another of the line buffers is gathering write data from the system bus.

5. The memory controller system of claim 1, wherein the set of ECC bits comprises a plurality of ECC bits.

6. The memory controller system of claim 1 and further comprising:
   a shared ECC decoder coupled between the memory controller and each of the system buses.

7. A method of writing data to a memory through a multi-port memory controller, the method comprising:
   (a) processing memory access requests received from a plurality of system busses through respective system bus ports of the memory controller, wherein each port has a respective ECC encoder having an ECC block width;
   (b) receiving write data from a first of the system buses;
   (c) if the write data has a width that is equal to the ECC block width, applying the write data to a first of the ECC encoders as an ECC block;
   (d) if the write data has a width that is less the ECC block width, reading data from the memory address within the memory through a first port of the memory controller and merging the data read from the memory address with the write data to form the ECC block and then applying the ECC block to the first ECC encoder;
   (e) generating a set of ECC bits with the first ECC encoder based on the ECC block; and
   (f) writing the ECC block and the set of ECC bits to the memory address through the first port of the memory controller.

8. The method of claim 7 and further comprising:
   (g) allowing access to the memory through ports other than the first port of the memory controller during any one of steps (b), (c), (d), and (e), except when reading from the memory address in step (d) or writing to the memory address in step (f).

9. The method of claim 8 and further comprising:
   (h) accessing the memory through a second port of the memory controller while merging the data in step (d).

10. The method of claim 8 and further comprising:
(h) accessing the memory through a second port of the memory controller while generating the set of ECC bits in step (e).

11. The method of claim 7 wherein the set of ECC bits generated in step (e) comprises a plurality of ECC bits.

* * * * *